United States Patent
D'Ambrosio

(10) Patent No.: US 12,362,780 B2
(45) Date of Patent: Jul. 15, 2025

(54) BIDIRECTIONAL DATA COMMUNICATION SYSTEM, IN PARTICULAR EXPLOITING A CDMA CODING AND TWO UNIDIRECTIONAL DATA BUSES

(71) Applicant: LEONARDO S.P.A., Rome (IT)

(72) Inventor: Marco D'Ambrosio, Pomezia (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 18/566,241

(22) PCT Filed: Dec. 12, 2022

(86) PCT No.: PCT/IB2022/062075
§ 371 (c)(1),
(2) Date: Dec. 1, 2023

(87) PCT Pub. No.: WO2023/111816
PCT Pub. Date: Jun. 22, 2023

(65) Prior Publication Data
US 2024/0267081 A1 Aug. 8, 2024

(30) Foreign Application Priority Data

Dec. 15, 2021 (EP) .................................. 21425064
May 6, 2022 (IT) ....................... 102022000009359

(51) Int. Cl.
*H04B 1/707* (2011.01)
*H04B 1/7073* (2011.01)
*H04L 12/40* (2006.01)

(52) U.S. Cl.
CPC ..... *H04B 1/7073* (2013.01); *H04L 12/40032* (2013.01); *H04B 2201/7073* (2013.01)

(58) Field of Classification Search
CPC .......... H04B 1/7073; H04B 2201/7073; H04L 12/40032; H04L 12/40
USPC ......................................... 375/154
See application file for complete search history.

(56) References Cited

U.S. PATENT DOCUMENTS

2004/0207722 A1* 10/2004 Koyama ............. H04M 19/041
 348/14.02
2017/0222829 A1 8/2017 Kessler et al.
2020/0358633 A1* 11/2020 Cui ..................... G06F 13/4291

OTHER PUBLICATIONS

International Search Report and Written Opinion from International Application No. PCT/IB2022/062075 mailed Feb. 16, 2023.

* cited by examiner

*Primary Examiner* — Kevin M Burd
(74) *Attorney, Agent, or Firm* — Dorsey & Whitney LLP

(57) ABSTRACT

Communication system, comprising: a first data bus configured to transport a first data signal according to a first transmission direction; a second data bus configured to transport a second data signal according to a second transmission direction different from the first transmission direction; a synchronization bus; and a plurality of local resources generating a respective local signal to be transmitted on the first and second data bus. All transceivers are modulated with CDMA encoding and take place following a synchronism signal. The unidirectionality of transmission on the data buses guarantees the absence of interference. The communication system is fully scalable.

12 Claims, 5 Drawing Sheets

BIDIRECTIONAL DATA COMMUNICATION SYSTEM, IN PARTICULAR EXPLOITING A CDMA CODING AND TWO UNIDIRECTIONAL DATA BUSES

CROSS-REFERENCE TO RELATED APPLICATIONS

This patent application is a U.S. national stage of PCT International Application No. PCT/IB2022/062785 filed Dec. 12, 2022, which claims priority to European patent application no. 21425064.9, filed on Dec. 15, 2021, and Italian patent application no. 102022000009359, filed on May 6, 2022, the entire disclosure of each of the foregoing applications is incorporated herein by reference.

Technical Sector of the Invention

The present invention concerns a bidirectional data communication system, in particular wherein the data is encoded according to a CDMA encoding and exchanged using two unidirectional data buses.

BACKGROUND OF THE INVENTION

Intercommunication systems installed on board avionics (e.g. helicopters or aircraft) for on-board communication applications are known in the state of the art. These systems use a main central unit (master) and some secondary station units in a star configuration.

These systems are designed to handle all radio and navigation communications, data links and internal/external communications and to integrate their functionality into a single architecture. These systems provide switching and routing functions to configure the internal and external communication resources of the aerial platform and the relative access of users to these resources. These functions are supported by control, amplification and interfacing units for all radio communication means installed on the platform. The design of such systems is typically modular, flexible and based on an open architecture so that they can be configured to meet various requirements and needs. The extensive use of fibre optic connections and an appropriate wiring layout are used to reduce crosstalk and electromagnetic interference.

However, the known systems are intended to be implemented on medium-large platforms, and should be redesigned to obtain a system applicable to other platforms. In fact, as mentioned, these systems are based on a federated architecture, with a central control unit and a series of secondary units, with considerable dimensions such that it would not be convenient to redesign them with smaller dimensions for cheaper solutions.

These systems therefore suffer from integration difficulties as they are difficult to scale, in addition to the high cost of production.

Aim and Summary of the Invention

Aim of the present invention is therefore to provide a communication system that overcomes the problems and limitations of the prior art.

The present aim is achieved by the present invention as it relates to a communication system, as defined in claim 1.

DETAILED DESCRIPTION OF PREFERRED EMBODIMENTS OF THE INVENTION

The present invention will now be described in detail with reference to the accompanying figures to allow a skilled person to make and use it. Various modifications of the embodiment described will be immediately clear to the skilled person and the general principles disclosed can be applied to other embodiments and applications without thereby departing from the protection scope of the present invention, as defined in the enclosed claims. Therefore, the present invention should not be considered limited to the embodiments described and shown but should be granted the widest protective scope in accordance with the features described and claimed.

Unless otherwise defined, all the herein used technical and scientific terms have the same meaning commonly used by the ordinary skilled in the art of the present invention. In case of conflict, the present invention, including the definitions provided, will be binding. Furthermore, the examples are provided for merely illustrative purposes and must not be regarded as limiting.

In particular, the block diagrams included in the enclosed figures and hereinafter described must not be considered as a representation of the structural features, i.e. construction limitations, but must be construed as a representation of functional features, namely inner properties of the devices and defined by the obtained effects i.e. functional limitations which can be implemented in different ways, so as to protect the functionality thereof (chance of functioning).

In order to case the understanding of the herein described embodiments, reference will be made to some specific embodiments and a specific language will be used to describe them. The terminology used in the present document aims at describing only particular implementations, and is not intended to limit the scope of the present invention.

Figure 1:
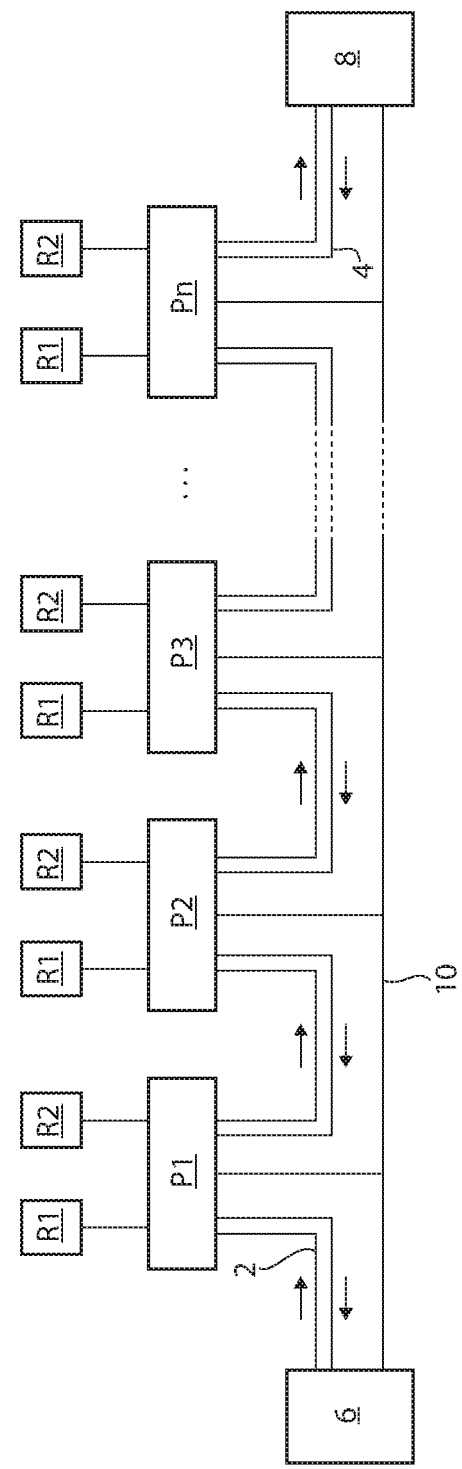
FIG. 1 shows a bidirectional communication system according to an embodiment of the present invention.

FIG. 1 schematically shows a communication system 1 according to an aspect of the present invention.

The communication system 1 comprises a first data bus 2 which, as shown below, is managed for unidirectional transmissions according to a first transmission direction, and a second data bus 4 which, similarly to the first data bus, is managed for unidirectional transmissions according to a second transmission direction different from and opposite to the first transmission direction. A first synchronization terminal 6 forms a start terminal of the first data bus 2 and an end terminal of the second data bus 4; a second synchronization terminal 8 forms a start terminal of the second data bus 4 and an end terminal of the first data bus 2. In this context, the first transmission direction is from the first synchronization terminal 6 towards the second synchronization terminal 8; the second transmission direction is from the second synchronization terminal 8 towards the first synchronization terminal 6.

A plurality of peripheral units P1-Pn (with "n" equal to or greater than two) are connected to both the first and second data bus 2, 4, between the first synchronization terminal 6 and the second synchronization terminal 8, to receive the data passing on the first and second data bus 2, 4 and in turn transmit data on the first and second data bus 2, 4.

Since the data buses 2, 4 are, as mentioned, managed as unidirectional buses, each peripheral unit P1-Pn receives the data transmitted by the peripheral units P1-Pn that logically precede it and can transmit to the peripheral units P1-Pn that logically follow it. The first and second synchronization terminals 6, 8 may also transmit data on the data buses 2, 4, depending on the predefined transmission direction. For example, the peripheral unit P2 receives, on the first data bus 2, the data transmitted by the peripheral unit P1 and by the first synchronization terminal 6, but not the data transmitted on the first data bus 2 by the peripheral units P3-Pn. The same peripheral unit P2 receives, on the second data bus 4, the data transmitted by the peripheral units P3-Pn and by the second synchronization terminal 8, but not those transmitted on the second data bus 5 by the peripheral unit P1 and by the first synchronization terminal 6.

A synchronization bus 10 connects the first synchronization terminal 6 and the second synchronization terminal 8 to the peripheral units P1-Pn. A synchronization signal used to ensure synchronous data transmission on the first and second data bus 2, 4 by the peripheral units P1-Pn passes on the synchronization bus 10, as explained in more detail below. In other words, all transmissions taking place on the data buses 2, 4 comply with the synchronism defined by the synchronization signal passing on the synchronization bus 10.

Each peripheral unit P1-Pn forms a connection interface of one or more user communication units (e.g., radio unit or operator console or generically utilities) to the first and second data bus 2, 4. The user communication units are then connected or generically coupled to respective peripheral units P1-Pn, to receive and transmit signals generated locally by the user communication units.

By way of non-limiting example, FIG. 1 shows two radio units R1 and R2 connected to each peripheral unit P1-Pn (although identified, for simplicity's sake, with the same reference R1, R2, the radio units R1 and R2 connected to one peripheral unit P1-Pn are different with respect to the radio units R1 and R2 connected to another peripheral unit P1-Pn).

The first data bus 2 and the second data bus 4 are, for example implemented by coaxial cables or optical fibres; the synchronization bus 10 is, for example, a coaxial cable or optical fibre.

Thus, the solution shown in FIG. 1 envisages using a double bus (first bus 2 and second bus 4) with a unidirectional open loop, wherein all the transmissions on the data buses 2 and 4 are synchronized with each other by means of the synchronization signal passing on the synchronization bus 10; the two data buses 2, 4 are physically separated from each other and start and end with the two synchronization terminals 6, 8. Each of the two data buses 2, 4 extends by connecting all the peripheral units P1-Pn according to a respective signal propagation direction.

The open double-loop architecture of the data buses 2, 4, with bus 10 dedicated to synchronization, allows to distinguish the two communication flows that travel on the data buses 2, 4 (according to the respective propagation direction), so as to ensure that each peripheral unit P1-Pn receives the data passing on the data buses 2, 4 (in the respective direction) only once, thus avoiding the risk of having simultaneous receptions of different transmissions coming from both directions. Moreover, this architecture allows to synchronize the transmissions thus avoiding the occurrence of any echoes and/or delayed packets.

It should be noted that the synchronization terminals 6, 8, in addition to having the task of generating synchronism, also perform the task of departure terminal and arrival terminal for the data buses 2, 4 (in FIG. 1, for example, the synchronization terminal 6 is at the same time the departure terminal for the first data bus 2 and the arrival terminal for the second data bus 4, while the synchronization terminal 8 is at the same time the arrival terminal for the first data bus 2 and the departure terminal for the second data bus 4, according to the directionality indicated for the transmission of the data).

The task of the departure terminal for the relative data bus 2, 4 comprises generating an encoded data sequence (which could contain generic system management information or "house-keeping" or other control data) for the relative data bus 2, 4; this data sequence is sent to all the peripheral units P1-Pn connected to said data bus 2, 4. As better shown below, each peripheral unit P1-Pn receives or acquires the data sequence passing on the data bus 2, 4, inserts its own data to be transmitted in such received data sequence, and transmits the new data sequence on the same bus 2, 4 from which it received it.

The task of the arrival terminal for the relative data bus 2, 4 comprises decoding all (multiplexed) data streams present in the received signal on the relative data bus 2, 4 and recording or storing such data. The data received by the arrival terminal are not re-entered on the data buses 2, 4.

Based on what has been described above, it is ensured that a single transmission by each peripheral unit P1-Pn will be received only once by any other peripheral unit P1-Pn (and relative radio units or utilities R1, R2 connected thereto).

The synchronization terminals 6, 8 are also configured to generate and transmit the synchronization signal on the synchronization bus 10. During use, only one of the synchronization terminals 6, 8 is configured as "Master" (the other can become "Master" in case of malfunction of the first); only the "Master" terminal generates and transmits the synchronization signal. All the peripheral units P1-Pn connected to the synchronization bus 10 are configured to receive and appropriately manage the synchronization signal, to transmit the relative data on the relative data bus 2, 4 based on the synchronization defined by the synchronization signal.

It should be noted that the architecture of FIG. 1 is devoid of a central unit and can be easily scalable according to the specific needs of the target platform of use, inserting and removing peripheral units and/or utilities R1, R2 at will and according to need.

Figure 2:
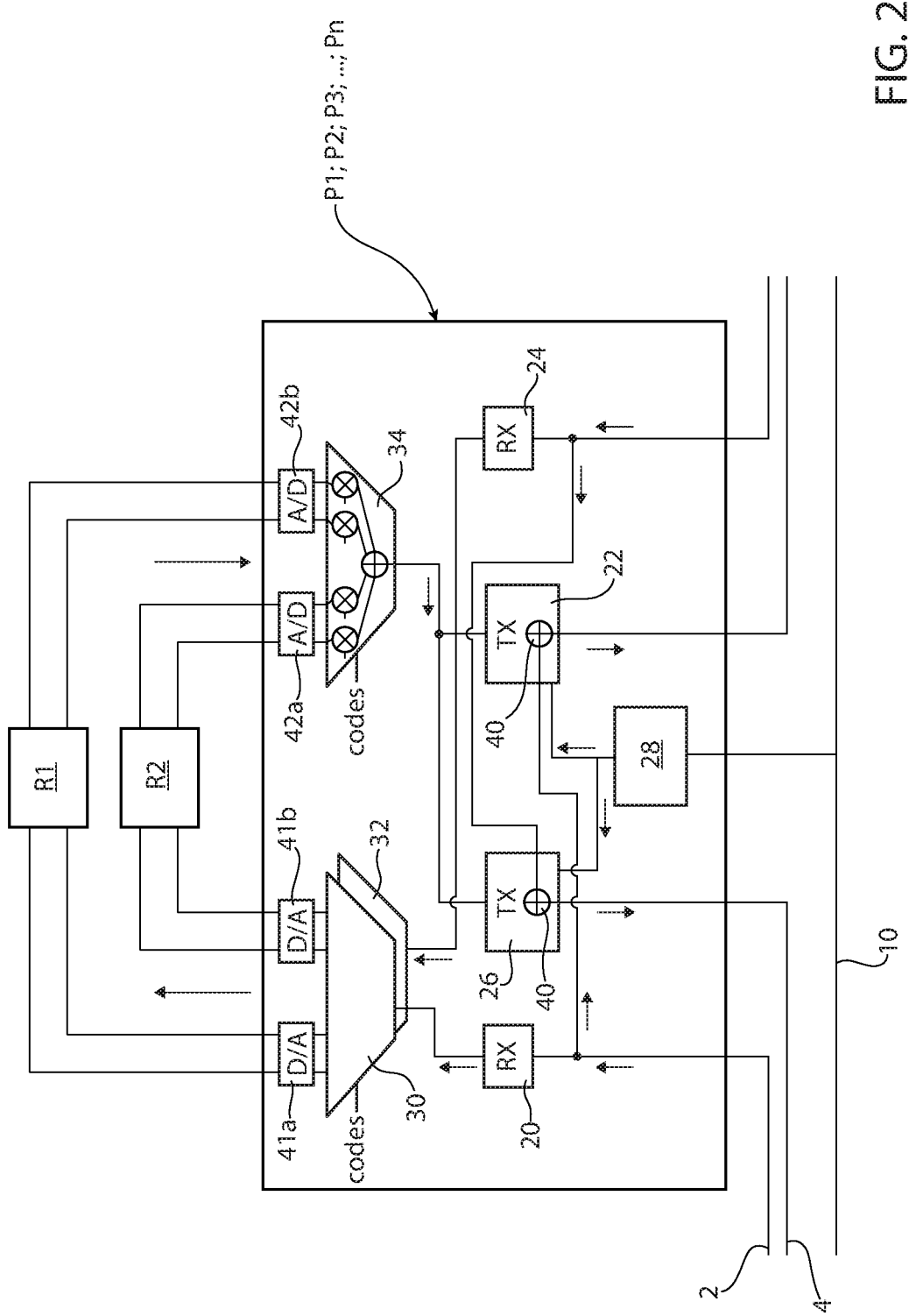
FIG. 2 shows a transceiver unit of the communication system of FIG. 1.

As shown in FIG. 2, each of the peripheral units P1-Pn is connected (from its back-end side) to the utilities R1, R2 (e.g., including radio systems or operator places of a vehicle on which the system of FIG. 1 is implemented, for example, aerial means). For example, FIG. 2 shows two radio units R1, R2 configured to receive as input audio signals to be reproduced, PTT ("Push-To-Talk") communications or of other type, and to generate as output audio and status signals. It is evident that the signals accepted as input and generated as output by the utilities R1, R2 are exemplary and may vary according to the type of utility and need for communication.

A multiplexer 34 is used to multiplex the signals in output from each radio unit R1, R2. Two demultiplexers 30, 32 are used to demultiplex the signals in input to the radio units R1, R2, these signals being received through the first and second data bus 2, 4. Precisely for this reason there is a demultiplexer 30 dedicated to the first data bus 2 and a demultiplexer 32 dedicated to the second data bus 4. As mentioned above, the radio units R1 and R2 are exemplary of possible units or systems coupled to the peripheral units P1-Pn, and may be replaced by, or be present in addition to, one or more of: operating places, such as a console; audio recorders; radio navigation terminals; etc. (in general, "back-end" terminals). The number of back-end terminals is a parameter defined during the design phase and can be modified at will as required.

Still with reference to FIG. 2, each of the peripheral units P1-Pn is connected (from its front-end side) to the first data bus 2, to the second data bus 4 and to the synchronization bus 10. More particularly, each peripheral unit P1-Pn comprises:

A first receiver 20, connected to the first data bus 2 to receive the data signals passing on the first data bus 2;

A first transmitter 22, connected to the first data bus 2 to transmit data signals on the first data bus 2;

A second receiver 24, connected to the second data bus 4 to receive the data signals passing on the second data bus 4;

A second transmitter 26, connected to the second data bus 4 to transmit data signals on the second data bus 4;

A synchronization module 28, connected to the synchronization bus 10 and to the first and to the second transmitter 22, 26, for receiving the synchronization signal passing on the synchronization bus 10 and providing such synchronization signal to the first and to the second transmitters 22, 26 in order to synchronize the transmissions;

The demultiplexer 30 (hereinafter also referred to as the first input demodulator 30), connected to the first receiver 20, to receive the data signal acquired from the first receiver 20 and perform an operation, in itself known, of demodulating and decoding the data signal, in order to deliver it to the recipient utility (radio unit R1, R2);

The demultiplexer 32 (hereinafter also referred to as the second input demodulator 32), connected to the second receiver 24, to receive the data signal acquired from the second receiver 24 and perform an operation, in itself known, of demodulating and decoding the data signal in order to deliver it to the recipient utility (radio unit or operator R1, R2);

the multiplexer 34 (also having signal modulation functions and therefore also referred to hereinafter as "output modulator 34"), configured to receive the signals generated in output from the utilities (radio unit R1, R2), perform modulation and encoding operations, and send such modulated and encoded signals to the transmitters 22, 26 for transmission on the data buses 2, 4 (the transmission of all the data takes place simultaneously on both data buses 2, 4, in the respective directions—i.e. all the data are split to be transmitted both on the bus 2 and on the bus 4).

Digital/analog converters 41a, 41b may be coupled to the output of the first and second input demodulator 30, 32 (i.e., between the input demodulators 30, 32 and the radio units R1, R2) and, likewise, analog/digital converters 42a, 42b may be coupled to the input of the output modulator 34 (i.e., between the output modulator 34 and the radio units R1, R2).

In the context of the present invention, the data signals are modulated (and thus transmitted on the first and on the second data bus 2, 4) using a CDMA ("Code Division Multiple Access") encoding. In CDMA systems, all utilities (in this example, the radio units R1, R2) use the same carrier frequency and can transmit simultaneously and continuously. Each radio unit R1, R2 is uniquely identified by pseudo-random numerical codes, orthogonal to each other, and transmits independently of the other radio units R1, R2. The first and the second input demodulator 30, 32, by a correlation process using such codes, detect the desired channel (code) during the demodulation process. In transmission, the radio units R1, R2 occupy the same band, their transmissions being divided into the code domain.

The output modulator 34 is configured to encode the signals received from the radio units R1, R2 according to the CDMA encoding and provide such encoded signals to the transmitters 22, 26 to which it is connected. The transmitters 22, 26 also receive the synchronization signal and use this synchronization signal to activate the transmission of the encoded signals on the first and second data bus 2, 4 synchronously. The synchronous transmission takes place for all the peripheral units P1-Pn; in fact, since the synchronization signal is the same for both data buses 2, 4 and for all the peripheral units P1-Pn, the transmissions are completely synchronized on both data buses 2, 4 and for all the utilities (radio unit, operator console, etc.) connected to the peripheral units P1-Pn.

In other words, each receiver 20, 24 acquires the data signal from the respective data bus 2, 4 and sends it to the respective demultiplexer/decoder 30, 32 to select the data addressed to a specific utility R1, R2. The transmitters 22, 26 add the data to be transmitted to the bit train received as input from the data bus 2 or 4, making each transmission synchronized with the data train coming from the other previous peripheral units P1-Pn.

Figure 5:
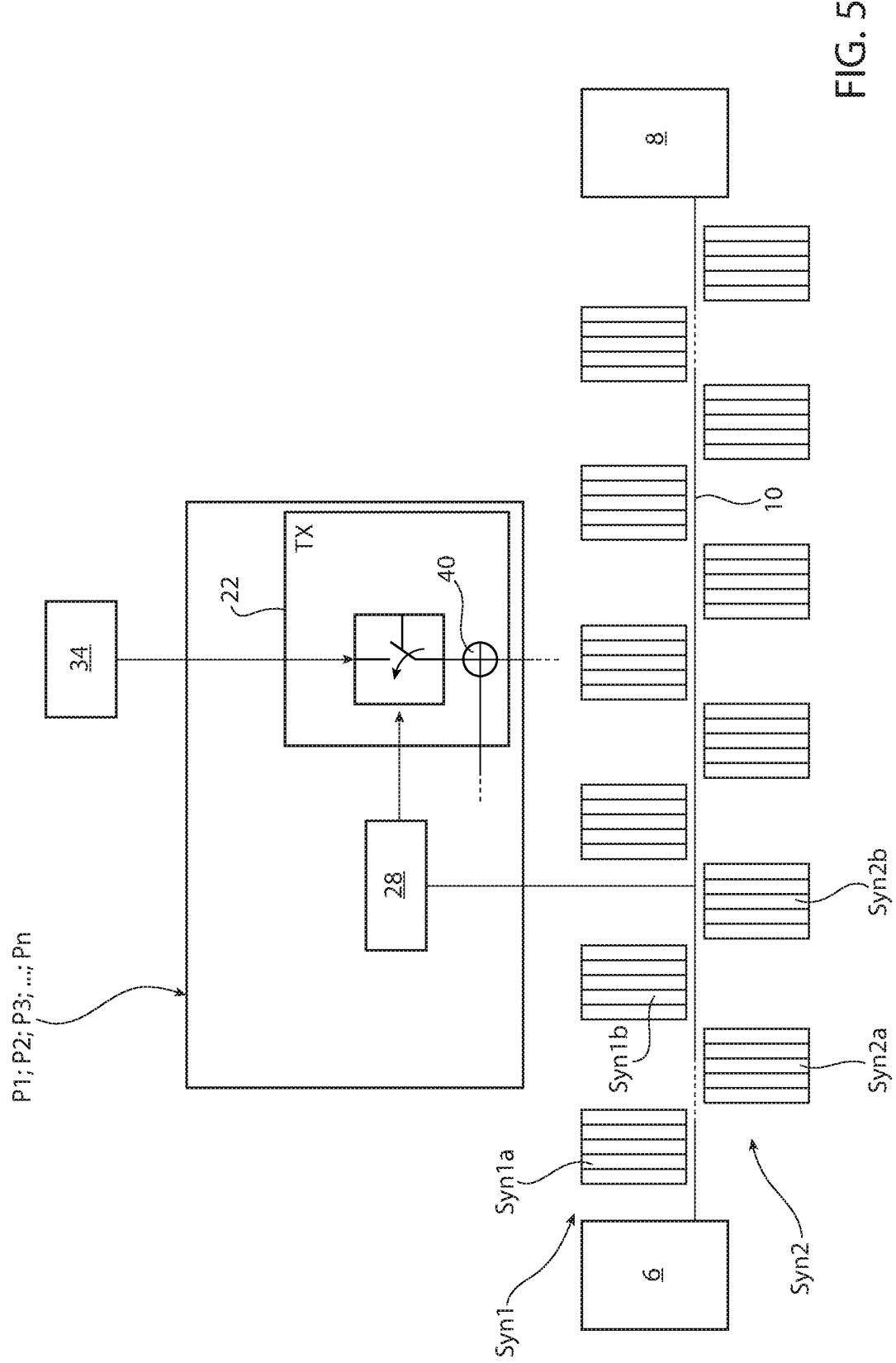
FIG. 5 schematically shows an operation of transmission of a synchronization signal.

The synchronization signal is, by way of example and not limiting the present invention, implemented with two synchronization signals Syn1, Syn2 modulated at distinct frequencies where the two carrier frequencies are f1 for the synchronization signal Syn1 generated by the first synchronization terminal 6 and f2 for the synchronization signal Syn2 generated by the second synchronization terminal 8. The principle diagram can be qualitatively the one represented schematically in FIG. 5. The terminal 6, or the terminal 8, which is configured as a "Master" defines the time, transmitting a first sequence Syn1a (which may or may not contain information), but which is as long as each of the sequences that circulate on the two data buses. 4, 6. Once the first sequence Syn1a is finished, a time interval of pause is awaited which is equal to the time of the subsequent sequence Syn2a generated by the other terminal 6 or 8 which is not a "Master" terminal (as depicted graphically in FIG. 5). Then, the first synchronization terminal 6 transmits for the odd sequences. In the time intervals in which the even sequences circulate on the two data buses 2, 4, it is the second synchronization terminal 8 that transmits its sequence. The transmission of the sequences is repeated for subsequent transmissions Syn1b, Syn2b, etc. The synchronization sequences Syn1 and Syn2 are structurally identical, with the exception of the transmission frequency, and they may optionally contain a preamble that allows the receivers 28 of the synchronization signals of each peripheral unit P1-Pn to distinguish the start of the synchronization sequence from the noise (the preamble may be simple, i.e. short, as it is not necessary to distinguish from other sequences, but only from the noise). The synchronization carriers can also be modulated by data signals to be exchanged only between the synchronization terminals 2, 4 for house-keeping operations, thereby dismissing the data buses 2, 4 from the request for additional channels specific to such needs. Alternatively, if it is wished to reduce the circuit complexity and the costs of the synchronization terminals 4, 6, the synchronization signals Syn1, Syn2 can be simple unmodulated tones (carrier frequencies f1 and f2) and the house-keeping messages could circulate on the two data buses 2, 4, on specific CDMA channels. The difference of the two frequencies f1 and f2 allows the synchronization receivers 28 to precisely detect the start and end time of each sequence Syn1a, Syn1b, . . . , Syn2a, Syn2b, . . . , with no possibility of overlap (and therefore interference), the frequencies being different from each other. In a possible embodiment, in the synchronization context previously described, the data stream on the two data buses 2, 4 can simultaneously flow on both data buses 2, 4, in the respective directions regardless of the two synchronization sequences received: upon receipt of the first sequence Syn1a (at frequency f1) the transmission on both data buses 2, 4 will be opened (i.e. the output of the multiplexers 34 feeds summators 40 in each peripheral unit P1-Pn—see FIG. 3 in which the summator 40 is shown and described); at the end, the outputs of the multiplexers 34 will be isolated and, upon receipt of the second sequence Syn2a (at frequency f2) the transmission on both data buses 2, 4 will be reopened; the cycle is repeated.

In the context of the example described above, the synchronization module 28 includes two receivers tuned to the two frequencies f1 and f2, recognizes the relative presence via the preamble and provides the summator 40 with the trigger in both occurrences (reception of each sequence Syn1a, Syn1b, . . . , and of each sequence Syn2a, Syn2b, . . . ), while isolating or inhibiting the summator 40 (at least for the part coming from the multiplexer 34) at the end of the relative synchronization sequence Syn1a, Syn1b, . . . , Syn2a, Syn2b.

It is apparent that any other synchronization diagram known in the state of the art can be implemented in the context of the present invention.

Figure 3:
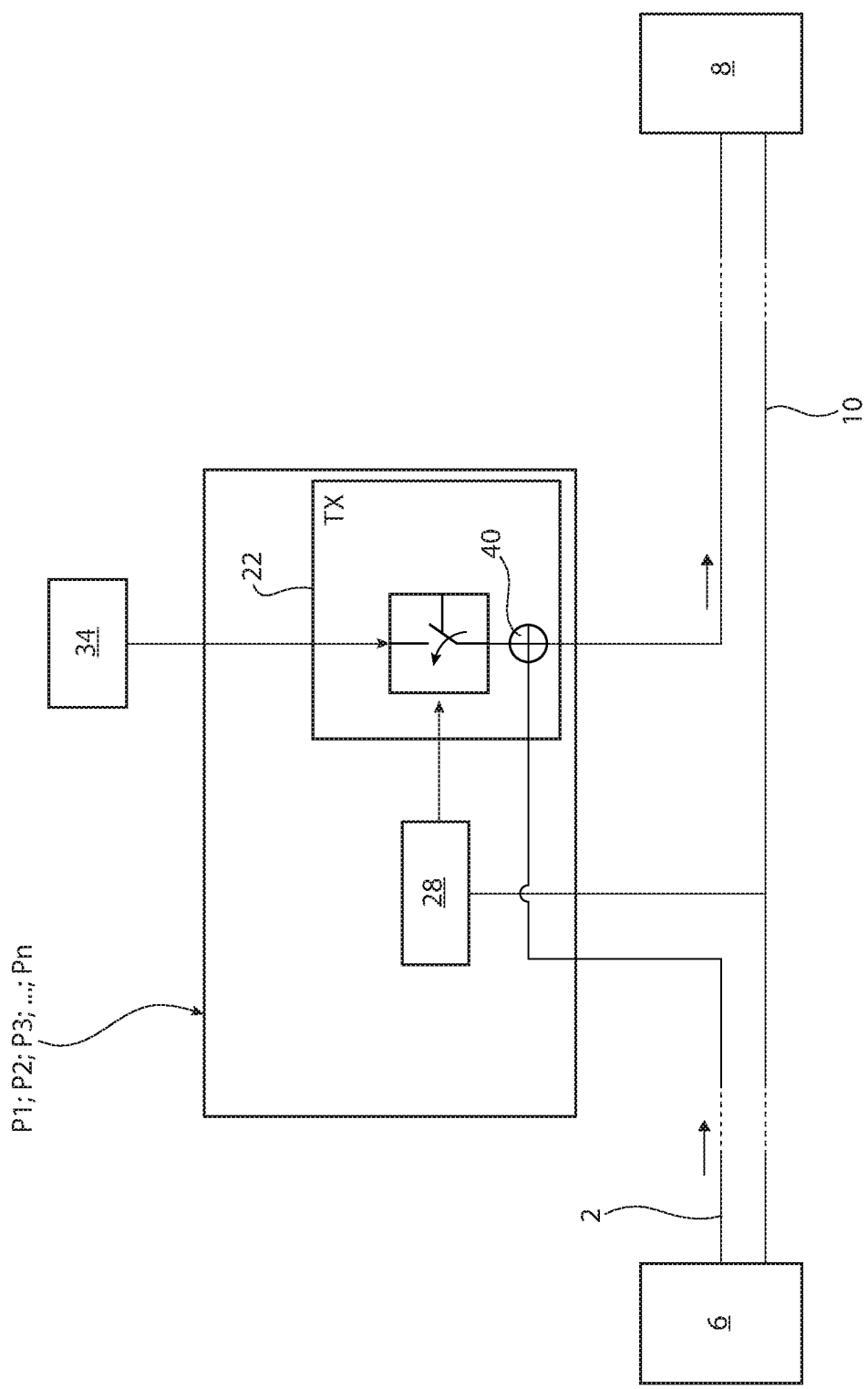
FIG. 3 schematically shows an operation of data transmission by the transceiver unit of FIG. 2.

FIG. 3 shows a schematic diagram of the operations that are performed by the peripheral units P1-Pn to allow each peripheral unit P1-Pn to correctly transmit, in synchrony, its own data sequences.

Digital data trains are initially created by the first synchronization terminal 6 for the first data bus 2, and by the second synchronization terminal 8 for the second data bus 4 (as mentioned above, such data may contain system management information); each of the first and second synchronization terminal 6, 8 transmits a sequence of data bits encoded and multiplied by its specific CDMA encoding sequence. If this synchronization terminal 6, 8 is a "Master" terminal, it also transmits the synchronization signal on the synchronization bus 10. Each of the peripheral units P1-Pn receives the data sequences via the respective receivers 20, 24 and decodes them via the input demodulators 30, 32; upon receipt of the synchronization signal on the synchronization bus 10, the synchronization receiver 28 activates the two transmitters 22, 26 to send their data to the summator module 40, which is configured to perform an operation of summing the data to be transmitted with those passing on the respective data bus 2, 4 (the same that are received in input from the receivers 20, 24, for the respective data buses 2, 4). In this way, the operation of summing the encoded data bits with the incoming data train is done exactly bit by bit in the desired sequence. The sum performed by the summator module 40 is a sum between analog signals (i.e. the one coming from the multiplexer/modulator 34 and the one coming from the data bus).

The unidirectionality of the transmission of each peripheral unit P3-Pn on the relative data bus 2, 4 is implemented through the provision of a decoupler or isolator or regenerative repeater at the input of each transmitter 22, 26 to prevent the signal coming from the respective data bus 2, 4 and directed to the input of the summator module 40 from returning back to the respective data bus 2, 4. However, it is clear that this decoupler can be omitted or be an integral part of the summator 40. The choice of the type of decoupler, or the implementation characteristics thereof, may also depend on the particular physical channel used for the data buses 2, 4 (if, for example, optical fibres are used, a transceiver can be used that receives from the input and retransmits as output the signal received from the multiplexer 34, with possible amplification/regeneration of the signal itself if necessary). In any case, from a logical/functional point of view it is envisaged using the decoupler and then, in cascade or in series with the latter, the summator. As mentioned, both functionalities could be implemented in the same component.

When a data train reaches the respective synchronization terminal 6, 8 that represent the "final" unit for that data bus 2, 4, the data train is decoded in all the CDMA sequences envisaged (based on the CDMA diagram used) to be recorded/stored.

A further processing of the data signal (e.g. EDAC encoding, modulation, etc.) may be provided to make the data signal resistant to noise or other interference. For example, the following signal conditioning may be used: Reed-Solomon encoding (RS (31,15)) for error detection and correction; unipolar-bipolar conversion; BPSK or QPSK or QAM modulations (e.g. $2^n$QAM, with n=4, 6, 8, etc., i.e. 16QAM, 64QAM, 256QAM, etc.) chosen as needed in terms of number of users/channels and channel bandwidth availability; raised cosine filtering.

Figure 4:
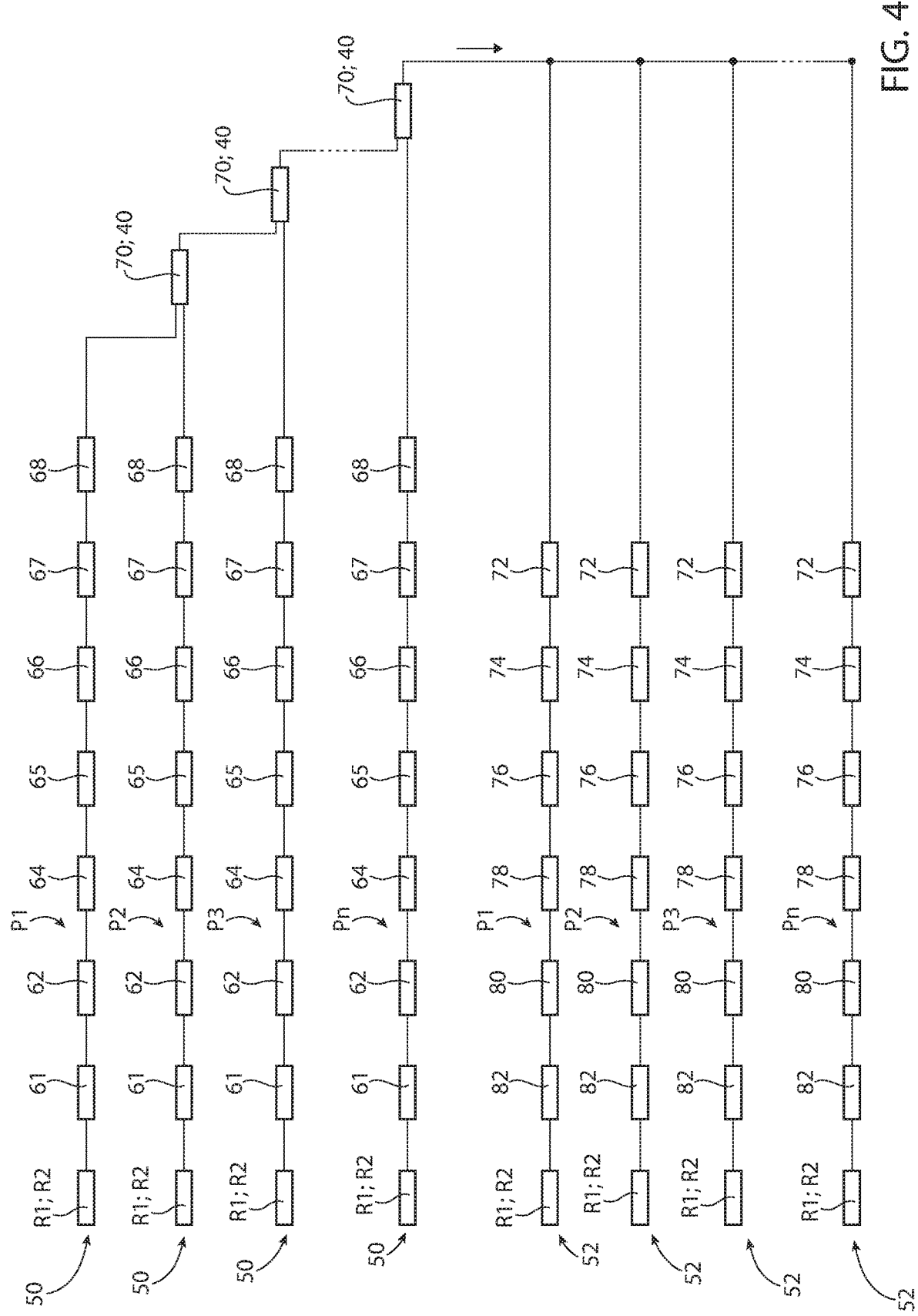
FIG. 4 shows, by means of functional blocks, transmission and reception chains according to an exemplary embodiment of the present invention.

FIG. 4 shows, by means of a functional block diagram, the transmission 50 and reception 52 chains according to an example of the present invention. Functional blocks representative of a plurality of transmitting peripheral units P1-Pn (i.e., the transmission chains 50) and of a plurality of receiving peripheral units P1-Pn (i.e., the reception chains 52) are shown.

The transmission chains 50 are equal to each other; similarly, the reception chains 52 are equal to each other. Therefore, a transmission chain 50 and a reception chain 52 will be described below, using the same reference numbers to represent blocks that are functional to each other corresponding and belonging to respective transmission 50 and reception 52 chains of respective peripheral units P1-Pn.

The transmission chain 50, for example associated with the transmission by a radio unit R1 of a radio unit P1, comprises (the order indicated in the figure of the sequence of blocks may vary, as is evident to the person skilled in the art):

an encoding block 61, configured to receive as input, from the radio unit R1, the data to be transmitted, and perform a Reed-Solomon encoding of said data received as input. The input data are generated by the radio unit R1 in analog format and are converted into digital format before the block 61 (A/D converter 42b of FIG. 2);

a unipolar-bipolar conversion block 62, having an input connected to the output of the encoding block 61, configured to receive from the encoding block 61 the Reed-Solomon encoded signal and perform a conversion from unipolar signal to bipolar signal of the signal received as input;

a buffer 64 (optional), having an input connected to the output of the conversion block 62, configured to receive as input the bipolar signal and convert scalar samples into a lower rate output frame;

an encoding block 65, configured to perform a CDMA encoding, having an input connected to the output of the buffer 64 and configured to perform the operation y=u*k, where y represents the output from the block 65, u represents the input to the block 65 (in digital format), and k is a vector representing the orthogonal code associated with the user R1. The operation "*" is a bitwise multiplication of the input u with the vector k;

a bipolar-unipolar conversion block 66, having an input connected to the output of the encoding block 65, and configured to receive perform a conversion from unipolar signal to bipolar signal of the signal received as input (i.e., the CDMA encoded data signal);

a modulation block 67, having an input connected to the output of the conversion block 66, configured to perform a BPSK (Binary Phase Shift Keying Method) modulation of the signal received as input (alternatively, a QPSK modulation, or of other type); and a filter 68, having an input connected to the output of the modulation block 67, configured to receive the modulated BPSK signal and perform an operation of filtering said signal using a $\cos^2$ FIR ("Finite Impulse Response") filter (to shape the pulse to be transmitted on the data bus).

The output from the filter 68 is then fed as input to a summator block 70, to perform the operation of summing the signal generated by a transmission chain 50 of a peripheral unit P1-Pn with another signal generated by another transmission chain 50 associated with another peripheral unit P1-Pn. This summing operation is the operation discussed with reference to FIG. 3, block 40.

The reception chain 52, for example associated with the reception by a peripheral unit Pn (other than P1) of data addressed to a radio unit R2 coupled to it, comprises functional blocks adapted to perform operations in reverse with respect to the transmission chain 50, and in particular comprises:

a filter 72, configured to receive as input the data signal transmitted on the data bus; the data signal is, in this schematic example, the signal given by the sum of the signals transmitted by all the transmission chains 50. The filter 72 performs the operation corresponding to the filter 68 (FIR filter);

a demodulation block 74, having an input connected to the output of the filter 72, configured to perform a BPSK (Binary Phase Shift Keying Method) demodulation of the signal received as input (alternatively, QPSK modulation);

a unipolar-bipolar conversion block 76, having an input connected to the output of the demodulation block 74, and configured to receive perform a conversion from unipolar signal to bipolar signal of the signal received as input;

a buffer 78 (optional), having an input connected to the output of the unipolar-bipolar conversion block 76, configured to receive as input the bipolar signal and convert scalar samples into a lower rate output frame;

a decoding block 80, configured to perform a CDMA decoding, having an input connected to the output of the buffer 78 (or to the output of the unipolar-bipolar conversion block 76 if the buffer 78 is not present);

a bipolar-unipolar conversion block 82, having an input connected to the output of the decoding block 80, and configured to receive perform a conversion from unipolar signal to bipolar signal of the signal received as input;

a decoding block 84, having an input connected to the conversion block 82, and configured to perform a Reed-Solomon decoding of the signal received as input and corresponding error correction.

The present invention may find application as (but not limited to):

Intercom system for aerial platforms;
Naval intercommunication system;
Intercom system between operating places aboard a ship or submarine;
In-vehicle land-based intercom system where ambient noise does not allow normal voice communication;
Video distribution between cameras and displays for a surveillance system.

From an analysis of the foregoing, the advantages that the present invention makes it possible to achieve are evident.

In particular, the present invention concerns an intercommunication system with a distributed architecture that does not require a central unit. This solution allows to reduce recurring costs, weights and dimensions necessary for the implementation of the communication system; it also allows to increase flexibility and scalability in order to allow the integration on board of lighter platforms with no need for a redesign of the central unit or of the complete system, but only by reconfiguring individual distributed units (the peripheral units P1-Pn).

It is also evident that modifications and variations can be made to the above without departing from the scope of the protection defined by the claims.

For example, CDMA encoding can be replaced by an encoding of different type, such as TDMA ("Time Division Multiple Access") or FDMA ("Frequency Division Multiple Access"). In this case, a linear relationship should be established between the number of users and the band required for the data buses 2, 4.

The invention claimed is:

1. A communication system, comprising:
a first data bus configured to transport a first data signal according to a first transmission direction;
a second data bus configured to transport a second data signal according to a second transmission direction different from the first transmission direction;
a synchronization-bus configured to transport a synchronization signal;
a first transceiver unit; and
at least one first resource coupled to the first transceiver unit (P1), configured to generate a first local signal to be transmitted on the first and/or second data bus;
wherein the first transceiver unit comprises:
a first receiver coupled to the first data bus to receive the first data signal;
a second receiver coupled to the second data bus to receive the second data signal;
a first transmitter coupled to the first data bus;
a second transmitter coupled to the second data bus;
a first synchronization module coupled to the synchronization bus to receive the synchronization signal;
a first demodulator having an input coupled to the first receiver and an output coupled to the first resource, configured to perform a demodulation of the first data signal;
a second demodulator having an input coupled to the second receiver and an output coupled to the first resource, configured to perform a demodulation of the second data signal received by the second receiver;

a first modulator having an input coupled to the first resource and an output coupled to the first and second transmitters, configured to receive the first local signal from the first resource and perform a modulation of the first local signal, generating as output a first modulated signal;

said second transmitter being configured to transmit the first modulated data signal on the second data bus according to said second transmission direction;

wherein the first transmitter is configured to sum the first modulated signal to the first data signal received by the first receiver from the first data bus, generating a third data signal, and transmit the third data signal on the first data bus according to said first transmission direction and in compliance with a synchronism defined by the synchronization signal; and wherein the second transmitter is configured to sum the first modulated signal to the second data signal received by the second receiver from the second data bus, generating a fourth data signal, and transmit the fourth data signal on the second data bus according to said second transmission direction and in compliance with said synchronism.

2. The communication system according to claim 1, further comprising:

a second transceiver unit;

at least one second resource coupled to the second transceiver unit, configured to generate a second local signal to be transmitted on the first and/or second data bus, wherein the second transceiver unit comprises:

a third receiver coupled to the first data bus to receive the first data signal;

a fourth receiver coupled to the second data bus to receive the second data signal;

a third transmitter coupled to the first data bus;

a fourth transmitter coupled to the second data bus;

a second synchronization module coupled to the synchronization bus to receive the synchronization signal; a third demodulator having an input coupled to the third receiver and an output coupled to the second resource, configured to perform a demodulation of the first data signal;

a fourth demodulator having an input coupled to the fourth receiver and an output coupled to the second resource, configured to perform a demodulation of the second data signal;

a second modulator having an input coupled to the second resource and an output coupled to the third and fourth transmitters, configured to receive the second local signal from the second resource and perform a modulation of the second local signal, generating a second modulated signal at the output;

said fourth transmitter being configured to transmit the second modulated data signal on the second data bus according to said second transmission direction;

wherein the third transmitter is configured to sum the second modulated signal to the first data signal received by the third receiver from the first data bus, generating a fifth data signal, and transmit the fifth data signal on the first data bus according to said first transmission direction and in compliance with said synchronism; and wherein the fourth transmitter is configured to sum the second modulated signal to the second data signal received by the fourth receiver from the second data bus, generating a sixth data signal, and transmit the sixth data signal on the second data bus according to said second transmission direction and in compliance with said synchronism.

3. The communication system according to claim 1, further comprising:

a first synchronization unit coupled to a first termination of the first data bus and a first termination of the second data bus;

a second synchronization unit coupled to a second termination of the first data bus and a second termination of the second data bus;

wherein the first transmission direction is toward the second synchronization unit and the second transmission direction is toward the first synchronization unit.

4. The communication system according to claim 1, wherein:

the first transmitter is configured to generate the third data signal by performing an algebraic sum of the first modulated signal with the first data signal;

the second transmitter is configured to generate the fourth data signal by performing an algebraic sum of the first modulated signal with the second data signal.

5. The communication system according to claim 2, wherein:

the third transmitter is configured to generate the fifth data signal by performing an algebraic sum of the second modulated signal with the first data signal; and the fourth transmitter is configured to generate the sixth data signal by performing an algebraic sum of the second modulated signal with the second data signal.

6. The communication system according to claim 1, wherein:

the first modulator is also configured to perform a CDMA encoding of the first local signal, generating at its output the first modulated signal;

the first demodulator is also configured to perform a CDMA decoding of the first data signal; and the second demodulator is also configured to perform a CDMA decoding of the second data signal.

7. The communication system according to claim 6, wherein:

the first modulator is also configured to demodulate the first local signal according to a BPSK or QPSK or QAM modulation after performing said CDMA encoding;

the first demodulator is further configured to demodulate the first data signal according to said BPSK or QPSK or QAM modulation prior to performing said CDMA decoding; and the second demodulator is also configured to demodulate the second data signal according to said BPSK or QPSK or QAM modulation before performing said CDMA decoding.

8. The communication system according to claim 6, wherein:

the first modulator is also configured to encode the first local signal according to a Reed-Solomon encoding before performing said CDMA encoding, the first demodulator is further configured to decode the first data signal according to said Reed-Solomon encoding after performing said CDMA decoding; and the second demodulator is also configured to decode the second data signal according to said Reed-Solomon encoding after performing said CDMA decoding.

9. The communication system according to claim 2, wherein:
the second modulator is also configured to perform a CDMA encoding of the second local signal, generating at its output the second modulated signal;
the third demodulator is also configured to perform a CDMA decoding of the first data signal; and
the fourth demodulator is also configured to perform a CDMA decoding of the second data signal.

10. The communication system according to claim 9, wherein:
the second modulator is also configured to demodulate the second local signal according to a BPSK or QPSK or QAM modulation, after performing said CDMA encoding;
the third demodulator is further configured to demodulate the first data signal according to said BPSK or QPSK or QAM modulation, prior to performing said CDMA decoding; and
the fourth demodulator is also configured to demodulate the second data signal according to said BPSK or QPSK or QAM modulation, before performing said CDMA decoding.

11. The communication system according to claim 9, wherein:
the second modulator is also configured to encode the second local signal according to a Reed-Solomon encoding before performing said CDMA encoding;
the third demodulator is further configured to decode the first data signal according to said Reed-Solomon encoding after performing said CDMA decoding; and
the fourth demodulator is also configured to decode the second data signal according to said Reed-Solomon encoding after performing said CDMA decoding.

12. The communication system according to claim 1, said communication system being one of:
an intercom system for aerial platforms;
a naval intercommunication system;
an intercom system between operating units aboard a ship or submarine;
an in-vehicle land-based intercom system; or
a surveillance system.

\* \* \* \* \*